United States Patent [19]

Blackwell et al.

[11] Patent Number: 4,574,393
[45] Date of Patent: Mar. 4, 1986

[54] GRAY SCALE IMAGE PROCESSOR

[76] Inventors: George F. Blackwell, 4809 Bear Rd.; Harold W. Tomlinson, Jr., 4020 Bay Park Dr., both of Liverpool, N.Y. 13088

[21] Appl. No.: 485,051

[22] Filed: Apr. 14, 1983

[51] Int. Cl.$^4$ ............................................. G06K 9/00
[52] U.S. Cl. ....................................... 382/17; 358/81; 364/526; 382/18
[58] Field of Search ..................... 358/81, 82, 42, 282; 382/17, 18, 51, 41; 364/526; 250/226; 356/405, 406, 416, 418, 425

[56] References Cited

U.S. PATENT DOCUMENTS

| | | | |
|---|---|---|---|
| 3,705,383 | 12/1972 | Frayer | 382/18 |
| 3,710,011 | 1/1973 | Altemus et al. | 358/82 |
| 4,075,604 | 2/1978 | Degasperi | 250/226 |
| 4,110,826 | 8/1978 | Möllgaard et al. | 364/526 |
| 4,326,258 | 4/1982 | de la Guardia | 358/282 |
| 4,399,469 | 8/1983 | Lew | 358/282 |

OTHER PUBLICATIONS

"A Simple Grey-Scale to Colour Converter"; R. P. Betts; Journal of Medical Engineering and Technology; vol. 3, No. 1, Jan., 1979; pp. 31-37.

Primary Examiner—Leo H. Boudreau
Assistant Examiner—Joseph Mancuso

[57] ABSTRACT

A method for determining the average gray value of a plurality of regions within a digitized electronic video image and for determining the color of the region from the average gray value. Initial image segmentation is accomplished by thresholding a multibit digital value into a one bit black and white representation of a picture element of the region. The gray values of the picture elements within either a black or a white region can then be analyzed to determine the average gray value by constructing a histogram of each region and eliminating from the histogram the picture elements not associated with the actual color or shading of the region of interest. The remaining picture elements are averaged to obtain the average gray value for the region.

7 Claims, 6 Drawing Figures

GRAY SCALE IMAGE PROCESSOR

BACKGROUND OF THE INVENTION

This application is directed to electronic processing of visual images and, more particularly, to a method for automatically processing monochromatic electronic image data for identifying colors within the visual image.

Electronic imaging equipment, for example solid-state cameras, are rapidly being incorporated into automated industrial processes. An overview of the operation of such imaging systems and a description of the capability of such systems are given in U.S. patent application Ser. No. 363,664 filed Mar. 31, 1982 by Beall, Tomlinson and Hart and assigned to General Electric Company, now U.S. Pat. No. 4,493,105, the disclosure of that application being incorporated herein by reference. One of the drawbacks in these imaging systems is that the electronic image is monochromatic, i.e., the camera is only capable of detecting light intensity so that the electronic image is processed in shades of gray. For most industrial processes, e.g. fabrication, assembly, packaging and dimension measurement, the only requirement is for shape and edge determination so that monochromatic images are satisfactory. However, these are occasions when identification or classification by color is desired. Such an occasion for automated inspection might occur, for example, in the inspection of pharmaceutical products such as pills which are often identified solely by color.

One prior art system for identifying color uses the intensity of the light reflected from an object as an indication of color. Since it is well known that different colors reflect different intensities of light, color differentiation can be based upon the relative comparison of gray scale values. A viewer of a monochrome television, i.e., a black-and-white television, will recognize that a striped or plaid item of clothing will appear striped or plaid in shades of gray. If relative intensity values, i.e., gray scale values, are assigned to each color, one can recognize the individual colors by comparison with known gray scale values. For electronic comparison, the gray scale value for a particular color can be determined and stored as a digital numerical value. Subsequent observations of objects by the camera can then be processed to yield their gray scale value and these values compared to the reference values.

In the prior art system, the reference gray scale values are set up with threshold values. If the observed gray scale value exceeds one threshold value but is less than another, it is assumed to be the color corresponding to that associated with the given threshold. The problem with such a system is that it is sensitive to minor changes in ambient lighting. Although the human eye readily recognizes that ambient lighting has changed and can quickly adjust to gray scale changes, the electronic system depends entirely on absolute values and cannot readily compensate for lighting changes. In addition, small objects such as pills may have surface pitting variations which effect reflectively or may be canted such that shadows appear in the field of view. If average reflectivity is determined over the field of view, the shadows or pitting may change the observed gray scale values and result in erroneous color identification.

It is an object of the present invention to provide a method for identifying color of an object in a field of view of a monochrome camera.

It is a further object of the invention to provide a method for electronically processing gray scale values in order to identify by color a plurality of objects within the field of view of a monochrome camera.

It is a still further object to provide a method for classifying gray scale values obtained from an electronic monochrome camera in order to identify surface irregularities in an object within the camera field of view.

SUMMARY OF THE INVENTION

In the present invention objects to be identified are viewed by a monochrome camera through a color filter selected to separate the desired object colors in intensity as seen by the camera. Each picture element within the camera field of view is assigned a gray scale value. The picture elements having values above a predetermined threshold are assumed to correspond to the object being viewed and the gray values for those elements are used to form a histogram representative of the frequency of occurrence of particular gray values. The gray scale values which are exceptionally high or low are ignored and the remaining values are averaged to determine the nominal gray scale value for the object. The nominal value is then compared with predetermined nominal values for colored objects under the same lighting conditions to thereby identify the color of the object.

In one embodiment of the invention, the histogram is further analyzed by requiring that a minimum number of picture elements have to occur at a particular gray scale value before those values are included in the nominal averaged value. In addition, to eliminate scale changes caused by shadows, only a limited percent of the picture elements representative of the highest gray scale values are used in the averaging calculation.

BRIEF DESCRIPTION OF THE DRAWING

The above and other objects and advantages of the invention will be better understood by reference to the following detailed description taken in conjunction with the accompanying drawings in which.

DETAILED DESCRIPTION

The process or system to be controlled, analyzed or monitored by this invention may take many and varied forms. However, in the exemplary embodiment of FIG. 1, a typical application is depicted. Here, manufactured parts 100 are rapidly passed by a visual inspection station on a moving conveyor belt 102. If the part is determined to meet acceptable criteria (e.g. predetermined quantized geometric features or color) it is permitted to pass uninterrupted on the conveyor belt or to be ejected into an "acceptable" bin or the like. On the other hand, if the part is determined to be defective, it is ejected from the belt into a "reject" bin (or perhaps permitted to continue if the acceptable parts are instead ejected from the belt). Typically, as many as 900 parts per minute may pass inspection station and there may be plural similar conveyor belts and inspection stations requiring similar capabilities for similar or different manufactured parts. The exemplary embodiment of this invention may be capable of servicing up to four such independent inspection stations, with a combined rate up to 600 parts per minute.

Figure 1:
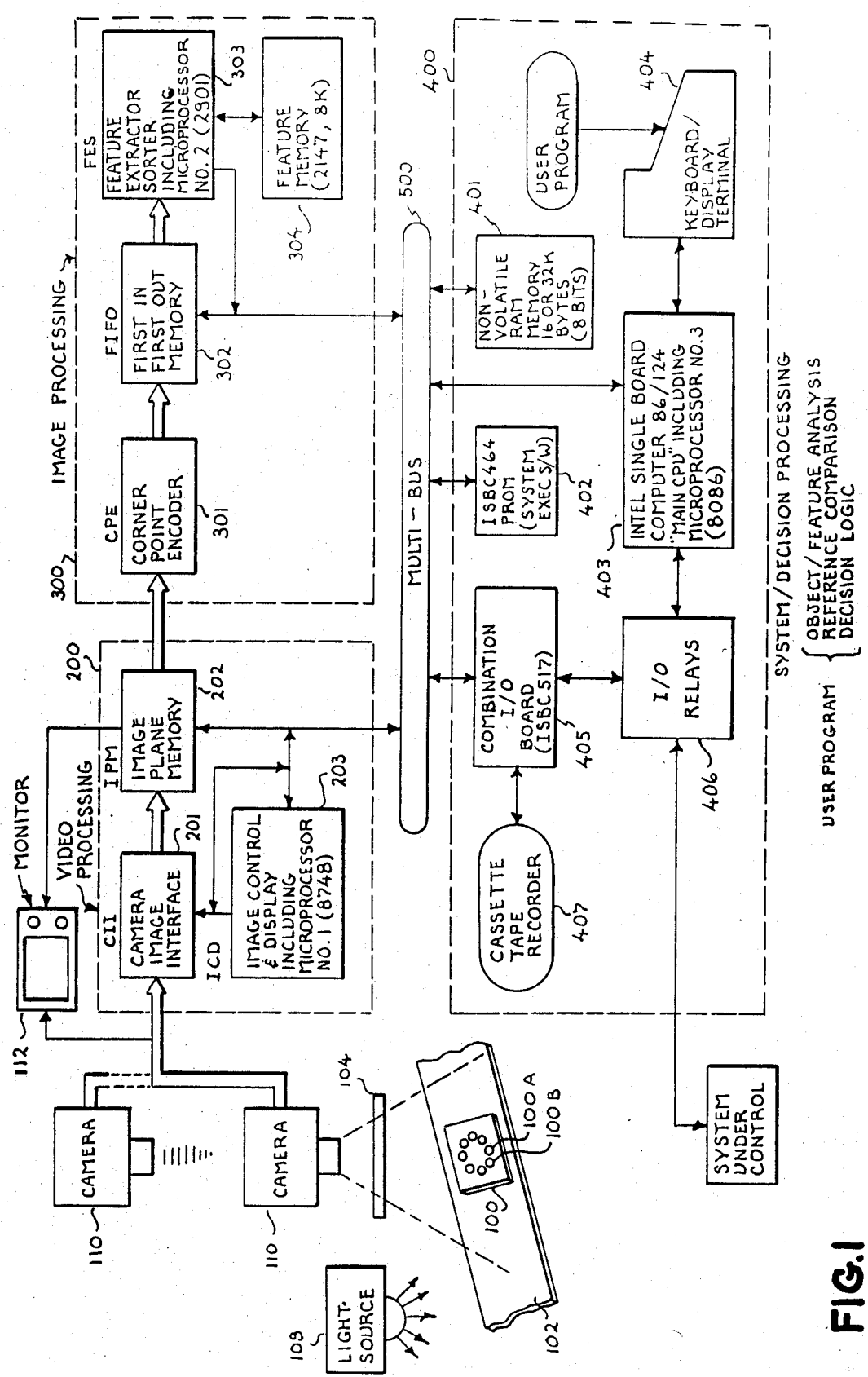
FIG. 1 is an overall block diagram of the system architecture employed in the presently preferred embodiment of the invention.

Typically, as shown in FIG. 1, movement of the part 100 under inspection will generate a "picture taking" process by a conventional electronic video camera 110 capable of converting the visual field of view within inspection station to a sequence of digital electronic video signals, each of which represents the intensity of a corresponding elemental picture element (i.e., pixel) of the field of view. A new frame of such video signals is provided for each part 100.

A suitable conventional camera used with the presently preferred exemplary embodiment of this invention is a solid state CID (charge injection device) camera manufactured by General Electric Company and marketed under Model No. TN 2500. Such video camera apparatus for capturing and reading out digitized video signals is also described in prior U.S. Pat. No. 3,805,062—Michon et al (1974) and U.S. Pat. No. 3,993,897—Burke et al (1976), both of which are, at present, commonly assigned herewith. As indicated in FIG. 1, additional cameras 110 (up to three) may be provided in the exemplary system so as to monitor up to four separate vision inspection stations if desired.

As shown in FIG. 1, the visual image processing system of this invention is divided into three major subsystems (in addition to the conventional camera inputs, the system under control or observation, the video monitor, etc.). In particular, the overall architecture of the system is divided into a video processing subsystem 200, an image processing subsystem 300, and an overall system/decision processing subsystem 400. These three subsystems are operatively interconnected via a common bus conductor system (e.g. Intel MULTIBUS TM) of address, data and control conductors 500.

Each frame of digitized video data emanating from camera(s) 110, includes a 244 by 248 array of pixels with each pixel being represented by an eight bit digital word representing the detected gray level (or gray scale value) for a respectively corresponding pixel of the CID camera. To reduce the volume of data involved, each pixel value is immediately thresholded with a controllable digital threshold word (value). Any pixel having a gray level equal to or greater than the threshold value will generate a single "1" valued bit (or alternatively a "0" valued bit) while any pixel having a gray level below the threshold value will generate a single "0" valued bit (or alternatively a "1" valued bit). The second least significant bit of the eight bit digital gray scale value is used to store the threshold bit while the least significant bit is used for a parity or other data bit in a manner well known in the art. The remaining six bits are used to store the gray scale of that pixel. Such "thresholding" is one of the functions performed by the camera image interface (CII) 201.

The resulting 244 by 248 by 8 bit array of binary valued video data for a given image "frame" is then steered to the image plane memory (IPM) 202 where it is temporarily stored (together with data identifying the camera from which it emanated, the frame sequence etc.) awaiting further processing by the image processing subsystem 300. The image control and display (ICD) module 203 includes microprocessor No. 1 (type 8748 in the exemplary embodiment) which has been programmed so as to synchronously control read out of IPM data to a video generator for the video monitor and, in the otherwise available time, to also control the CII 201 and the IPM 202 and the initiation of the readout cycle for the appropriate camera(s) 110.

Because the video processing subsystem 200 includes independent decision processing logic (including some dedicated hardware logic), it is enabled to quickly respond to the presence of a part within the inspection area of a monitored line so as to capture a frame of video data within the camera of that particular inspection area. As soon as time permits, a readout cycle of the appropriate camera(s) is initiated while substantially simultaneously thresholding the digital output of the camera and storing the resulting thresholded and intensity data within the image plane memory 202 so that it will be immediately available whenever the image processing subsystem 300 is next available for processing it.

In the exemplary system, all of these video processing subsystem functions are carried out under the general supervision of the main CPU in the overall system/decision processing subsystem 400 via the common bus conductors 500. New frames of video data are captured, thresholded and temporarily stored until needed by the video processing subsystem 200 requiring only a minimum of supervisory control by the system/decision processing subsystem 400. This division of labor permits the video processing subsystem 200 to perform these vital initial data compression and buffer storage functions for plural independent camera monitoring systems. Other functions are also performed by the video processing subsystem. For example, the video monitor 112 is synchronously fed digital video signals representing the contents of one or more selected planes within the image plane memory. Alternatively, the monitor 112 may be connected so as to directly receive and display the gray scale video output of any of the cameras 110 as may be desired.

In the exemplary embodiment, the image processing subsystem 300 signals the system/decision processing subsystem 400 whenever it finishes the processing of a frame of data and is thus next available for processing another frame. Thereafter, the main CPU in the system/decision subsystem 400 signals the video processing subsystem 200 to transmit another frame of thresholded and previously stored digital video data from the image plane memory 202 to the corner point encoder (CPE) 301 of the image processing subsystem 300. The corner point encoder 301 is, in the exemplary embodiment, a free running dedicated hardware device designed to automatically identify and encode corner points within an input frame of binary valued video data.

A simple list of the x,y coordinates of the corner points as well as the IN and OUT vectors associated with each corner point is then stored in a "first-in-first-out" (FIFO) memory 302 which acts as an output buffer for the corner point encoder 301. That is, a dedicated logic decision module is permitted to run freely to identify and encode corner points and to store them in the FIFO buffer memory 302. Accordingly, this function may be performed substantially independently and asynchronously with respect to the other ongoing functions being performed within the overall system.

The list of unsorted but encoded corner points in FIFO memory 302 may then be accessed as required by another dedicated decision logic module, the feature extractor/sorter (FES) 303 (including microprocessor No. 2 which, in the exemplary system, is a type 2901). The feature extractor/sorter 302 identifies and constructs closed linked sets (sometimes referred to as chains, subsets, lists, etc.) of the corner points first identified by the corner point encoder 301 in feature memory 304.

In the exemplary embodiment, many of the desired geometric features to be associated with each thus identified closed edge contour of the object under examination are incrementally calculated during the sorting process. That is, each time a corner point is added to a linked chain of such points (which will eventually, when closed, represent a closed edge contour), an incremental calculation is made of the perimeter, area, centroid, principal angle, maximum-minimum xy boundaries, etc., by making these calculations incrementally as each new corner point is associated with a linked list of corner points, an overall time saving is often possible when compared with a more traditional approach which waits until the entire closed edge boundary is identified before performing and summing similar incremental calculations. This is so because the incremental calculations can often be performed right at the time a new corner point is linked to a given chain while the image processing subsystem 300 is otherwise performing steps required to initiate the identification of yet another linked corner point. In other words, time that might otherwise be spent only in setting up the decision logic to identify another linked corner point may be simultaneously used to perform incremental calculations of predetermined geometric features that have to be made at some point anyway. The resulting linked lists or chains of corner points identifying closed edge contours of the object under test as well as many quantized geometric features of such contours are thus formed in the feature memory 304. Such data is thereafter transferred via the common bus conductor system 500 to an on-board RAM within the main CPU 403 of the system/decision processing subsystem 400.

The system/decision processing subsystem 400 is a typical microprocessor-based system having a core memory 401 for storing data that is to be directly accessed by the main CPU and a PROM memory 402 for storing computer programs (e.g. user-generated programs, system and/or executive programs, etc.). Its overall operation is controlled by a main CPU which, in the exemplary embodiment, is an Intel single board computer 86/12A which includes an 8086 microprocessor (the 3rd microprocessor in the exemplary embodiment). The main CPU 403 communicates with a conventional keyboard/display terminal 404 via a conventional RS232 communication link. Standard combination input/output boards 405 and/or conventional I/O relays 406 are provided for generating suitable drive signals to reject/accept actuators or other conventional components of the system under control or observation. If desired, a mass storage device (e.g. a cassette recorder) 407 may be provided for storing additional user-generated computer programs or the like. User-generated programs may of course be originally input via the keyboard 404 or through an I/O device such as the recorder 407.

As will be appreciated, once the closed edge contours within a given thresholded frame have all been identified (each by a closed linked set of corner points) and/or once the predetermined geometric features calculated by the feature extractor/sorter 303 have been quantized and stored in the RAM memory within 403, user-generated programs may be designed as desired to analyze such closed edge contours, to compare these quantized parameters with previously stored comparison parameters and/or to otherwise devise suitable decision logic for accepting/rejecting or otherwise analyzing the closed edge contours under examination. In the exemplary system, each closed edge contour is represented by a closed linked set of corner point coordinate data which is itself linked to a collection of data describing predetermined geometric features of the "blob" thus defined (e.g., the number of corner points involved, the maximum and minimum x,y coordinates, the x,y coordinates of the centroid, the area, the perimeter, the x,y coordinates of the principal angle, etc.). Other features of the thus identified and described "blob" may of course be quantized and/or otherwise analyzed by user-generated decision logic as may be desired.

The system shown in FIG. 1 and described generally above is shown and described in more detail in co-pending application Ser. No. 363,664 filed Mar. 31, 1982 by Beall, Tomlinson and Hart and assigned to General Electric Company, the disclosure of which is incorporated by reference. As disclosed in that application, the system of FIG. 1 will automatically identify the shape and corner points of an object in the field of view of camera 110 and establish a boundary about such object. For objects such as 100 which comprise a plurality of sub-objects 100A, 100B, etc., the camera system will provide boundaries about each of the sub-objects ("a bounding box") whereby they may each be analyzed as individual objects. In essence, the camera system electronically masks off the areas of interest within the field of view, i.e., it forms windows within the field which can be individually analyzed.

Figure 2:
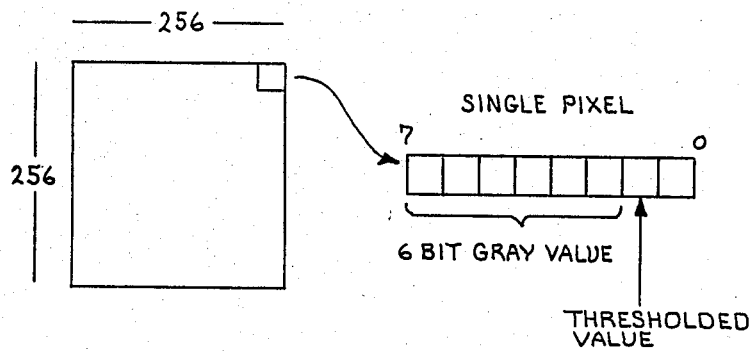
FIG. 2 illustrates the manner in which gray scale values for a picture element are stored in the system of FIG. 1.

As described above each of the pixels within the field of view is associated with an eight bit binary number, six bits of which are stored to represent the gray scale value of the pixel. FIG. 2 is illustrative of one such pixel and the format for its associated gray scale value. Each "frame" is comprised of a 256×256 matrix of pixels. The number of pixels defining an object such as 100A will clearly depend on the overall size of the total object 100 within the field of view. However, the sub-object 100A must be defined by several pixels in order to accurately identify its color. The video processing system automatically compares the gray scale value of each of the objects 100A, 100B, etc. to a predetermined threshold value to establish whether there is an object within the field of view. The result of this comparison is stored in the next least significant bit position and is used to determine whether the associated gray scale value is to be used in determining the nominal or average gray scale value for the sub-object.

The thresholded information and the bounding box information obtained from the threshold analysis are used to find the particular pixels in the 256×256 image to be included in the analysis. If the gray scale calculation is to be performed on object 100A, a microcoded routine executed by FES 303 scans the pixels within the bounding box of object 100A (stored in IPM 202) until a "white" pixel, i.e., a pixel having a value above the threshold, is found (a black pixel could be used if the object were black). For all white pixels in the bounding box, a histogram of the corresponding gray values is formed, i.e., a comparison of frequency of occurrence versus gray value. Histogram analysis is then used to eliminate gray scale values which are exceptionally high or low and may be the result of blemishes or shadows on the part. The remaining pixels are averaged to determine the gray scale value for the object. A comparison of the averaged gray scale value to predetermined gray scale values of objects of known colors enable identifying the object 100A by color.

It will be noted that the threshold analysis provides a very fast means to identify and locate objects in the camera field of view. In addition, by using the bounding box feature of the objects, the amount of data that has to be analyzed for the histogram is greatly reduced. Typically only 200 pixels are within a small objects bounding box whereas the whole scene may contain 64,000 pixels.

Figure 3:
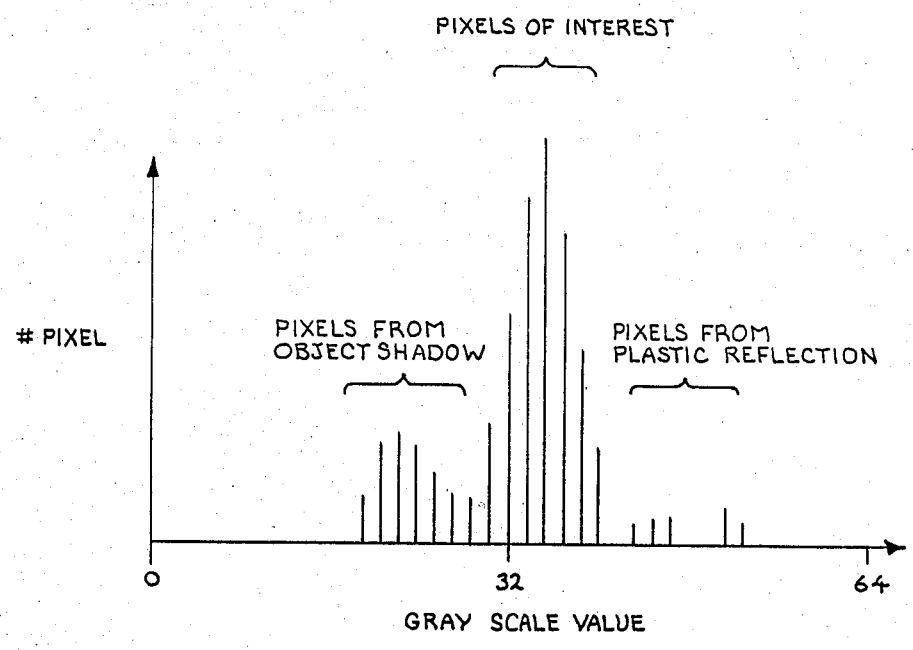
FIG. 3 illustrates a typical histogram of gray scale values versus frequency of occurrence for one object within a camera field of view.

Referring now to FIG. 3 there is shown a typical histogram for an object viewed by a monochrome camera. For this histogram a plurality of different colored objects were viewed while packaged in clear plastic. The objects were viewed while on a dark (black) background to provide contrast for threshold imaging. The histogram of FIG. 3 represents only pixels from one of the objects and shows several pixels that are very bright because of reflections from the plastic. A larger number also appear in the lower intensity range because of shadows. The results depicted in this histogram are typical. Clearly, the inclusion of all pixel data in computing an average gray scale value will produce an erroneous average value. However, it can be seen that the pixel values associated with reflected intensities from the object 100A tend to constitute the majority of the pixel values. Accordingly, the present invention provides a method for utilizing that data associated with the actual reflected intensities from the object 100A while substantially ignoring the data associated with bright spots or shadows. The preferred method for eliminating spurious data is through empirical evaluation of known samples. Such evaluation has determined that valid data can be obtained by using only the brightest fifteen percent of the pixels providing that gray scale values within the scale range which are represented by only one or two pixels are omitted.

The hard wired dedicated system of FIG. 1 contains the necessary operating programs to perform object identification and location and establish bounding boxes for each of the objects 100 as the objects pass in front of the camera 110. The system also provides the gray scale values for each of the pixels which impinge upon each of the objects 100A, 100B, etc. As described above, this gray scale information is stored in memory within the system of FIG. 1. The method of the present invention for identifying color of objects such as 100 when passing in front of the camera 110 is incorporated into this system in the form of a software program. This software program is included with this application and forms a part thereof. For a better understanding of the operation of this software program, reference may be had to the flow chart shown in FIGS. 4A, 4B and 4C.

Figure 4A:
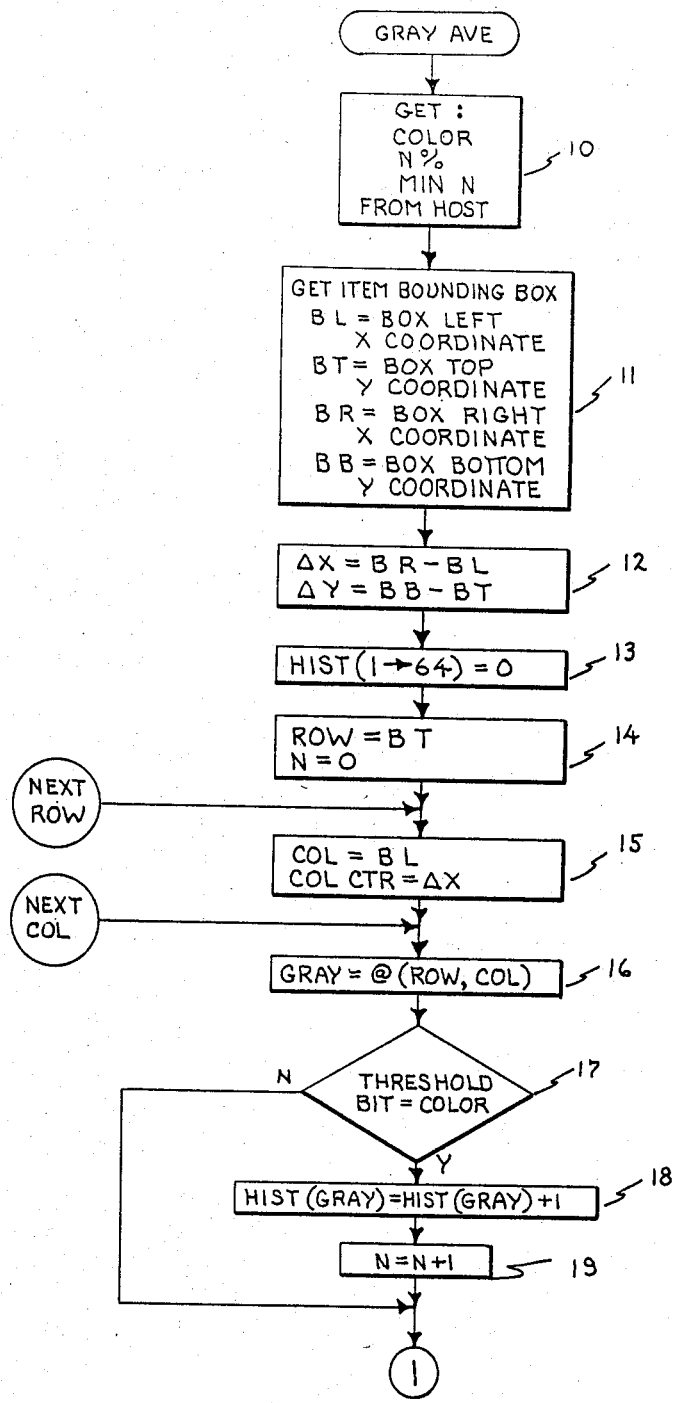
FIG. 4 comprising the FIGS. 4A, 4B and 4C is a flow chart depicting the method according to the present invention for obtaining color from a monochromatic digital electronic image.
Figure 4B:
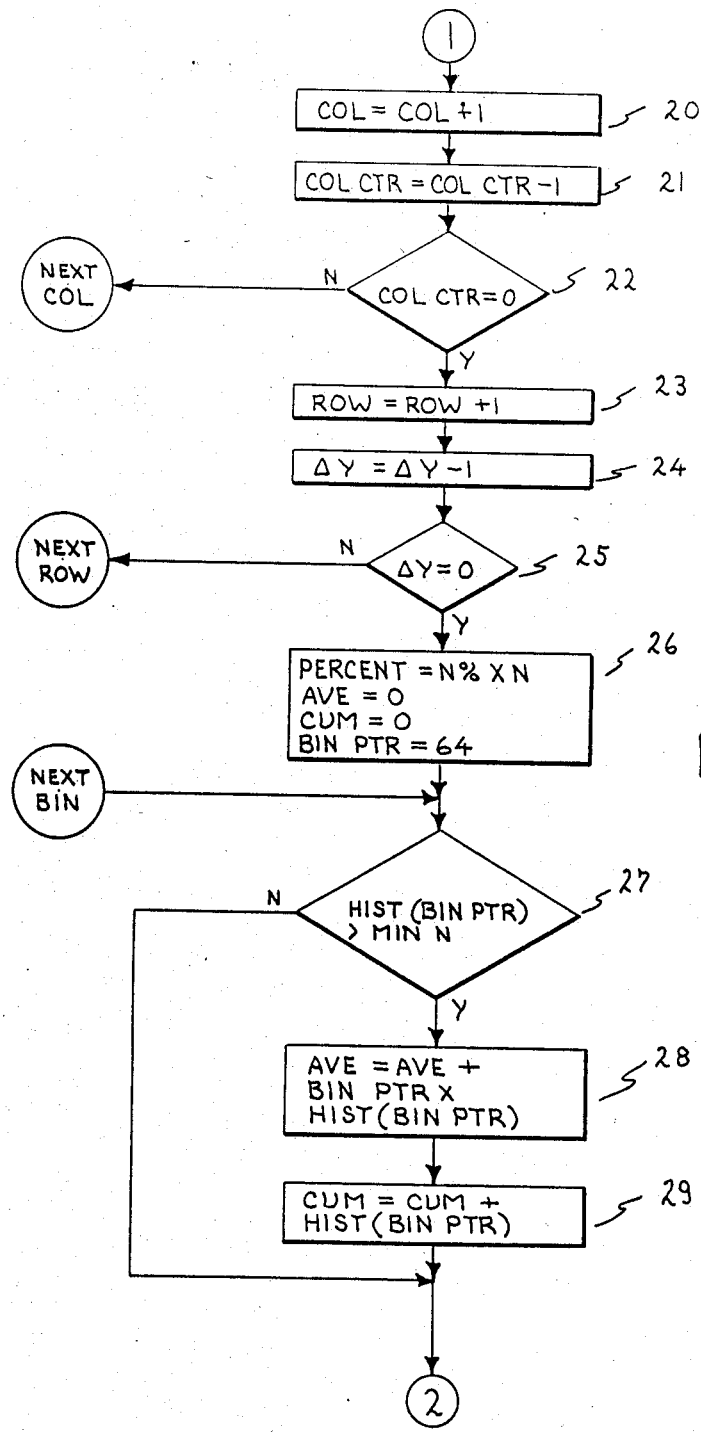
Figure 4C:
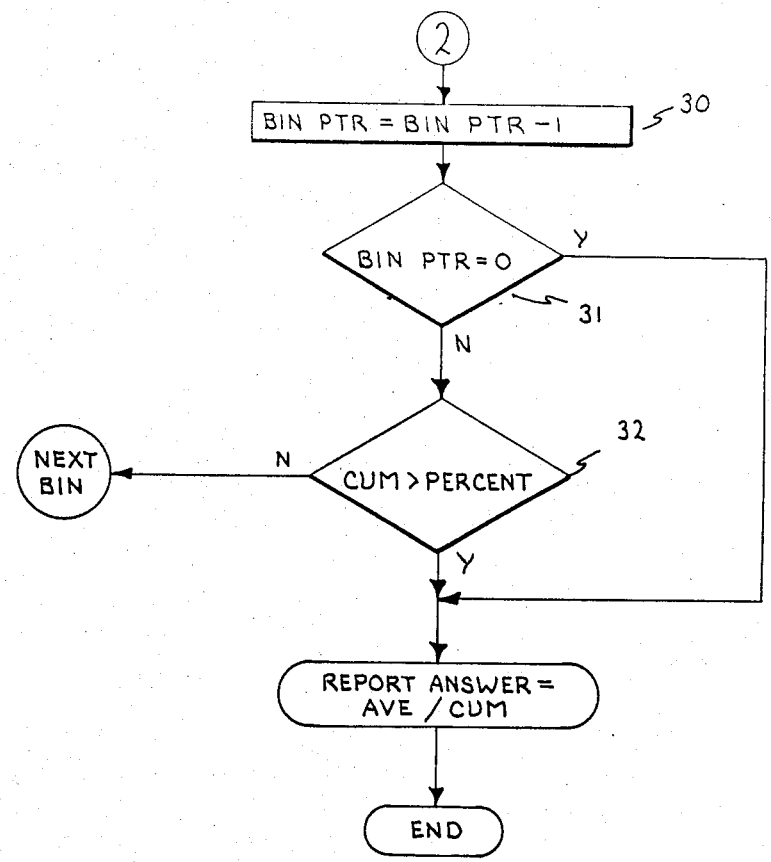

Referring now to FIG. 4A, the program, entitled "Gray Ave", i.e., Gray Averaging, when initiated under user command begins in block 10 by calling for certain user input information. The block 10 is entitled Get Color, N%, Min N From Host. The color information is nothing more than an instruction from a user to the apparatus to look only for a white threshold item or a black threshold item, i.e. whether a "1" or "0" is located in the second least significant bit position in a gray scale value. As previously described, the system of FIG. 1 includes an operating system which automatically thresholds each gray scale value for each pixel and places either a "1" or a "0" in the second least significant bit depending upon whether that particular pixel is above or below some predetermined threshold value. The operating system for providing this minimum amount of information is shown and described in the aforementioned co-pending U.S. patent application Ser. No. 363,664. The N% identifies what percent of the histogram the user wants to use in computing or determining the average gray scale value for the object being used. As previously discussed a value of 15% of the total available pixels has been found to be adequate providing that the 15% is taken from the pixels having the highest gray scale values. The MIN N is also a user input which establishes the minimum number of pixels at a particular gray scale value which must occur in order for that group of pixels to be counted in computing the average intensity or average gray number. For example, if two pixels at a particular gray scale value are set as a minimum, then only gray scale values having three or more pixels whose intensity value is above the threshold will be included in computing the average gray value. As will become apparent later, the average gray value is computed by multiplying the number of pixels at a particular intensity value by the intensity value for those pixels. All computed values are then summed and the sum divided by the number of pixels included in computing the sum.

Once the ground rules for the program have been established the next step is shown in block 11 in which the bounding box dimensions are obtained from memory within the image processing system 300 shown in the system of FIG. 1. The bounding box information establishes the particular pixels which will be utilized for preparing a histogram of pixel intensity distribution. The bounding box is also sometimes referred to as a rasterline bounding box since it establishes the dimensions based upon the fartherest left, right, top and bottom point of an object to be analyzed.

Once the bounding box for an object has been determined, the program next calculates the dimensions of the box by subtracting the left coordinate value from the right coordinate value and the top coordinate value from the bottom coordinate value. This process then results in the computation of a $\Delta X$ and $\Delta Y$ value representing dimensions of the bounding box around an object.

The next step in the method of this invention is to initialize a memory storage area for acceptance of the data for all of the controls to be analyzed. As shown in block 13, the histogram data for values between 1 and 64 are initialized to zero. It should be noted that the value of 64 establishes the number of distinct gray scale values which can be analyzed. As was previously disclosed, the particular system is set up to operate on an 8 bit binary word but subsequently the two least significant bits of that word are used for purposes other than establishing a gray scale value. Accordingly, only six bits are then available for numerically assigning of gray scale values. For purposes of this description it is assumed that the gray scale values would be divided equally, i.e., values above the midway point would be considered white values and those below would be considered black values. Accordingly, only sixty-four bins or gray scale values were then left to be evaluated.

The box labeled 14 merely establishes an initial position within IPM 202 for the beginning of the analysis. The row is set to the bounding box top Y coordinate and the number of pixels in the histogram is set to zero. This process sets the number N=zero so that it can keep track of the number of pixels which are evaluated and also initializes the operation so that each bounding box in analysis will start at the top row. The number N will be incremented for each pixel which is found in the analysis to have a gray scale value above the minimum threshold.

The box labeled 15 is similar to the box 14 in that it sets a column address to the box left coordinate and also sets the column counter COL CTR equal to ΔX, i.e., to the number of columns actually in the bounding box. In essence the boxes 14 and 15 have started the analysis at the upper left hand corner of a bounding box and as will become apparent, will be incremented such that the analysis will proceed on a column by column basis along the first row and then reset to the second row and proceed from there until all the pixels within the bounding box have been analyzed.

The next step in the process is to finally obtain the actual gray value at the particular pixel addressed by the row and column counters by permitting FES 303 to directly address IPM 202 via multibus 500. This is shown in block 16. Once the gray value has been called up, the system then checks the second least significant bit to determine if that gray value is to be considered in the analysis. Assuming that the color of the object being checked is one in which the second bit is desired to be a "1", then the block 17 will check that bit and determine whether the gray scale value for that particular pixel is to be included. Note, however, that the second least significant bit could be either a "1" or a "0" bit depending upon whether the objects are dark or light with respect to the background. If the determination is that the threshold bit is not in the proper state set by the color variable, then the program increments the column counter so that the next pixel can be analyzed.

As shown in block 18, if the threshold bit is set to the proper binary digit, then the intensity value associated with that particular pixel is used to increment the histogram at that particular intensity value. In addition, the number N is incremented by one to show that another pixel was found having a value greater than the minimum threshold value.

As shown in blocks 20, 21 and 22, the next step after identifying a pixel having at least a minimum threshold value and storing that value in the histogram, the system updates the column counter so that the next adjacent pixel in the row under evaluation can be analyzed. The block 22 in which the column counter equals zero test (COL CTR=0) is performed determines whether or not the system has reached the last pixel in a particular row so that the system can then step to the next row.

The blocks 23, 24 and 25 perform the row checks once the column counter has indicated that a row has been completed. Block 23 increments the row number by one, the block 24 increments the ΔY number by one and the block 25 determines whether the last row has been completed, i.e., whether ΔY is equal to zero.

Once all the pixels in a bounding box for an object have been evaluated, the next step in the method of this invention is to evaluate the gray scale values for all of the pixels of interest in order to arrive at a nominal or average gray scale value for the object. In block 26 the percent is established as N%×N where N is the number of pixels in the histogram. The N% is the number which was initially established at, for example 15%, for the number of pixels to be included in the average value. The memory space associated with the average value is initialized at "0", i.e., AVE. is set at "0", and the memory space assigned to the cumulative value is also initialized at zero. The bin pointer (BIN PTR) is set to 64 so that the analysis can start at the pixel having the highest gray scale value.

Block 27 illustrates the decision process for determining whether pixels associated with a particular gray value are to be included in determining the average value. If the number of pixels in the histogram at the bin pointer position is less than some selected value, e.g., three, then the values at that bin pointer position are not included and the bin pointer is incremented to step to the next intensity value. If the number of pixels having that particular gray scale value is greater than the minimum value of two, then the value stored in the average value register is updated by adding to it the product of the intensity value associated with that bin pointer position and the number of pixels which were found to have that particular intensity value. The cumulative value (CUM) is then updated as shown in block 29 by adding to the previous value the number of pixels which have then been used in computing the AVE. value. The bin pointer is then decremented by one to step to the next intensity value.

Block 31 is a check to determine whether there are any remaining gray values greater than the threshold in the histogram to be evaluated. If the bin pointer value is equal to zero then there are no remaining gray values and the system immediately computes the desired nominal value for the object by dividing the average value by the cumulative value to obtain the average gray scale value. If the bin pointer is not equal to zero at that time then the system checks, as shown in block 32, whether the cumulative number of pixels evaluated is greater than the minimum percent established. If, for example, the percent number is now equal to 15, then no more pixels need be evaluated and the answer is reported as the average divided by the cumulative value. Otherwise the process continues by stepping to the next bin containing the next gray intensity value and continuing the analysis.

The average gray scale value obtained from the above described method is then compared with previously obtained gray scale values established by running sample units through the system and computing their gray scale values.

In order to separate and identify several different color objects using a monochrome camera which provides an image only in shades of gray, it is necessary to select a filter 104 which provides distinct light intensity reflections from each of the different colored objects. One method for choosing such a filter is to examine the object under a monochromatic light which can be varied from the ultraviolet to the infrared range. A plot of the reflected intensity of the light for that color object can then be made and compared with plots of objects of other colors to determine which particular light frequency provides a reflection from each of the objects which is separate and distinct. A filter of that particular wave length can then be utilized to permit the monochrome camera to obtain images from the different colored objects which are distinguishable based upon their gray scale values.

It will be appreciated that although the light source 108 in FIG. 1 is shown as a single source, it is generally necessary to provide multiple light sources in order to obtain uniform lighting over the objects to be viewed by the camera 110. It will also be appreciated that the threshold values for different colors are a function of lighting and F-stops on the camera. Any change in the ambient lighting on the objects will affect the reflectivity of those objects and thereby affect the gray scale values obtained for them. There are several possible normalization techniques which can be used to compensate for variations in ambient lighting. For an object such as 100 which is actually comprised of several sub-objects each of which may be different colors, one technique for normalization involves processing several sample objects through the system, computing the average intensity value for each position or for each sub-object, and summing up all the average intensity values to get an average normalization value for the full picture. A similarly computed normalization value is then obtained for each object processed during the production run. If the normalization value deviates from the average normalization value obtained during the set-up mode, then the assumption can be made that the lighting has changed. The difference in the normalization value for each picture can be divided by the number of sub-items in the picture and that value then used to add or subtract from the gray scale value calculated within the sub-routine for each particular sub-object.

An additional normalization technique which is somewhat more involved but compensates for scenes in which the light may vary within the scene is to compute the average gray scale values over a number of sample scenes for each position. That average gray scale value is then used as a nominal value for a particular position. The nominal value can also be subtracted from the gray scale value to obtain a compensated gray scale value to use for color comparison to the expected color value. For example if the nominal gray scale value for a color of yellow was 50 in one position but because of light variations turned out to be only 40 in another position, then absolute values would be ineffective in determining the actual color of the object. Accordingly by computing a gray scale value for each color in each position and then compensating that value by substracting the nominal gray scale value from the actual gray scale value, one can use the same expected color value for each particular position for each color. A normalization technique is included in the programs incorporated with this application.

Although the present invention has been described as particularly useful in identifying objects in accordance with a color, it will be appreciated that the system could also be utilized to identify anomalies in an object by looking only at the shadows rather than excluding them, i.e., by eliminating the peak values associated with the highest reflectivity and looking for the secondary peaks associated with shadows, one can determine whether the surface of the object is smooth or pitted. Those skilled in the art of designing vision processing systems will recognize that many variations and modifications may be made in the exemplary embodiment of the invention while yet retaining many of the novel and advantageous features of this construction and or operation. Accordingly, all such variations and modifications are intended to be included within the scope of the following appended claims.

```
AMDOS/29 AMDASM MICRO ASSEMBLER: V1.4
GRAY2.SRC V1.0 (1/21/82)

;
        ;THIS ROUTINE DETERMINS THE AVERAGE GRAY VALUE OF ALL ITEMS IN
        ;A SCENE. IT SCANS ALL THE PIXELS IN THE ITEMS BOUNDING BOX UNTIL A PIXEL WITH
        ;RIGHT COLOR IS FOUND (BLACK OR WHITE).  THEN IT SUMS THE GRAY VALUE
        ;AT EACH PIXEL INTENSITY (HISTOGRAM).
        ;THEN THE BRIGHTEST NX OF THE HISTOGRAM IS FOUND AND AVERAGED
        ;TO FIND THE ITEMS GRAY VALUE
        ;
        ;DATA INPUT IN BUF-PARM SHOULD BE THE START ADDRESS OF THE ARRAY WHERE THE
        ;AVERAGE DATA IS TO BE STORED.  THE PART COLOR, THE NX
        ;VALUE AND THE MINIMUM BIN INTENSITY
        ;(1=WHITE, 0=BLACK).
        ;
        ORG H#028A
        ;
028A  DIV: EQU H#274
        ;
028A  GRAY:: CONT &AM2901.B,,AND.ZA,.R15,R15 &HOLDFEMA          ;BUF.PARM OFFSET=0
028B         JCSI,TASK,FOUR,PARMS%                              ;GET PARMS
028C         CONT &CTRL.LRL LOAD.LRL.H#0000,SCRCHA              ;LRL=SCRATCH PAD ADD
028D         CONT &AM2901.B,..OR.DZ.LRL.R7.R7 &HOLDFEMA         ;R7=LRL
028E         CONT &CTRL.LRL LOAD.LRL.H#0040                     ;LRL=64
028F         CONT &AM2901.B,,FEMA,.ADD.DA.LRL.R7,R7 &HOLDFEMA   ;FEMA AT SCRA+64
0290         CONT &AM2901.B,,FEM,.OR.ZA,.R0,R0 &HOLDFEMA        ;STORE ARY.ADD
0291         CONT &AM2901.B,,FEM,.OR.DZ.FEM.R0,R0 &MOD.FEMA SWAP ;SWAP DATA
0292         CONT &AM2901.B,..OR.ZA,.R15,R1 &HOLDFEMA           ;R15=COLOR
0293         CONT &AM2901.B,,FEM,.OR.ZA,.R2,R2 &MOD.FEMA        ;STORE NX(UHW)
0294         CONT &AM2901.B,,FEM,.OR.ZA,.R3,R3 &HOLDFEMA        ;STORE MIN
0295         CONT &CTRL.LRL LOAD.LRL.H#0000,SCNAA               ;LRL=SCNAA
0296         CONT &AM2901.B,,FEMA,.OR.DZ.LRL &HOLDFEMA          ;FEMA=LRL
0297         CONT &AM2901...OR.ZA &MOD.FEMA.LOWER.13            ;AT SCNA
0298         CONT &AM2901.B,..AND.DG.FEM.R13,R13 &HOLDFEMA      ;R13=#BLOBS IN CURRENT SCENE
0299         CONT &AM2901.B,..OR.DZ.LRL.R7,R7 &HOLDFEMA         ;R10=ITEM CTR
029A         CONT &CTRL.LRL LOAD.LRL.H#000A,H#9804              ;IPM MODE ADD
029B         CONT &AM2901.B,,MBAR,.OR.DZ.LRL &HOLDFEMA          ;MBAR=LRL
029C         CONT &CTRL.LRL LOAD.LRL.H#0000,H#0000              ;GRAY SET
029D         CONT &AM2901.B,,MBOR,.OR.DZ.LRL &HOLDFEMA          ;MBOR=LRL
029E         CONT &AM2901.B,,FEM,.OR.DZ.LRL &HOLDFEMA           ;SET MODE
029F         JCSI WRT.B0B%,TASK,MB.CMPLT
02A0  NXT.BLB: CONT &CTRL.LRL LOAD.LRL.H#0000,CBAA              ;LRL=CBAA
02A1         CONT &AM2901.B,,FEMA,.OR.DZ.LRL &HOLDFEMA          ;FEMA=LRL
02A2         CONT &AM2901.B,,FEMA,.SUB.2.DA.FEM.R10,R10 &HOLDFEMA ;AT CBA
02A3         CONT &AM2901.B,..AND.DG.FEM.R11,R11 &HOLDFEMA      ;R11=SBD ADD
02A4         CONT &CTRL.LRL LOAD.LRL.H#0000,H#0002              ;LRL=2
02A5         CONT &AM2901.B,..AND.DG.FEM.R2,R2 &HOLDFEMA SWAP   ;FEMA AT SBD+2
                                                                ;R2=B.R
```

```
02A6        CONT  &AM2901.B,,,AND,DQ,FEM,R1,R1 &MOD.FEMA
02A7        CONT  &AM2901.B,,,AND,DQ,FEM,R0,R0 &HOLDFEMA SWAP
02A8        CONT  &AM2901.B,,,AND,DQ,FEM,R3,R3 &HOLDFEMA       ;R1=B.T
02A9        PLRCI,TASK.5                                       ;R0=B.L
02AA        CONT  &AM2901.R,B,,ASR,0,OR,ZA,,R0,R0 &HOLDFEMA    ;R3=B.B
02AB        CONT  &AM2901.R,B,,ASR,0,OR,ZA,,R1,R1 &HOLDFEMA    ;LOOP 8X
02AC        CONT  &AM2901.R,B,,ASR,0,OR,ZA,,R2,R2 &HOLDFEMA    ;SCALE TO IPM COOR
02AD        BRZF  &AM2901.R,B,,ASR,0,OR,ZA,,R3,R3 &HOLDFEMA
02AE        CONT  &AM2901.B,,,MINUS,2,AB,,R3,R1 &HOLDFEMA      ;R3=DELY
02AF        CONT  &AM2901.R,B,,ASR,0,OR,DZ,LRL,R11,R11 &HOLDFEMA ;R11=COLOR MASK
02B0        CONT  &AM2901.B,,,MINUS,2,AB,,R2,R0 &HOLDFEMA      ;R2=DEL X
02B1        CONT  &AM2901.B,,,ADD,INC,ZA,,R3,R3 &HOLDFEMA      ;DELY+1
02B2        CONT  &AM2901.B,,,ADD,INC,ZA,,R2,R2 &HOLDFEMA      ;DELX+1
02B3        PLRCI,TASK.H#3                                     ;LOOP 4X
02B4  BRZF  &AM2901.L,B,,ASL,0,ADD,AB,,R1,R1 &H0000            ;YSTART*256
02B5        CONT  &CTRL.LRL  LOAD.LRL.H#00E,H#0000             ;IPM SEG
02B6        CONT  &AM2901.B,,,OR,DA,LRL,R1,R1 &HOLDFEMA        ;YSTART AT CORRECT SEG
02B7        CONT  &CTRL.LRL  LOAD.LRL.R4,R2 &HOLDFEMA          ;R4=DELX
02B8        CONT  &CTRL.LRL  LOAD.LRL.H#0000,H#0100            ;LRL=ROW INC
02B9        CONT  &AM2901.B,,,OR,DZ,LRL,R5,R5 &HOLDFEMA        ;R5=ROW INC
02BA        CONT  &AM2901.B,,,OR,AB,,R1,R0 &HOLDFEMA           ;R1=COL ADD OR X START
02BB        CONT  &AM2901.B,,,OR,ZA,,R6,R1 &HOLDFEMA           ;R1=START ADD
02BC        CONT  &CTRL.LRL  LOAD.LRL.R14,R14 &HOLDFEMA        ;GRAY MASK
02BD        CONT  &CTRL.LRL  LOAD.LRL.H#0000,SCRCHA            ;R14=GRAY MASK
02BE        CONT  &AM2901.B,FEMA,,OR,DZ,LRL,R7,R7 &HOLDFEMA    ;LRL=SCRCHA
02BF        CONT  &AM2901.B,FEMA,,OR,DZ,LRL,R7,R7 &HOLDFEMA    ;R7=FEMA=LRL
02C0        PLRCI,TASK.H#3F                                    ;ZERO HIST ARRAY
02C1  BRZF  &AM2901.B,FEM,,AND,DZ,FEM &MOD.FEMA
02C2        CONT  &AM2901.B,,,AND,ZA,,R9,R9 &HOLDFEMA          ;N=0
02C3 SRT.COL: CONT &AM2901.B,,,MBAR,,OR,ZA,,R5,R5 &HOLDFEMA    ;FIRST IPM ADD
02C4        CONT  &CTRL.LRL  RD.8036                           ;READ 1ST VALUE
02C5        JCI,TASK,NXT.COL$                                  ;INTO LOOP
02C6 NXT.PIX: CONT &AM2901.B,MBAR,,ADD,INC,ZA,,R6,R6 &HOLDFEMA ;NEXT ADD
02C7        CONT  &CTRL.LRL  RD.8036                           ;READ VALUE
02C8        CONT  &AM2901.R,B,,ASR,0,AND,DA,MBDR,R12,R14 &HOLDFEMA ;R12=GRAY VALUE/2
02C9        CONT  &AM2901.R,B,,ASR,0,OR,ZA,,R3,R12 &HOLDFEMA   ;R3=GRAY VALUE/4
02CA        CONT  &AM2901.B,,,AND,AB,,R12,R11 &HOLDFEMA        ;R12=PIXEL COLOR
02CB        CONT  &LCCR  &AM2901.,,,XOR,AB,,R12,R15 &HOLDFEMA  ;CK COLOR
02CC        JCI,NZ,NXT.COL$                                    ;WRONG COLOR
02CD        CONT  &AM2901.B,,,FEMA,,ADD,AB,,R7,R3 &HOLDFEMA    ;HISTO ADD
02CE        CONT  &AM2901.B,,,FEM,,ADD,INC,DZ,FEM &HOLDFEMA    ;INC ADD
02CF        CONT  &AM2901.B,,,ADD,INC,ZA,,R9,R9 &HOLDFEMA      ;N=N+1
02D0 NXT.COL: CONT &LCCR &AM2901.B,,,MINUS,1,ZA,,R4,R4 &HOLDFEMA ;END OF ROW?
02D1        JCI,Z,NXT.ROW$                                     ;NEXT ROW
02D2        PLRCI,TASK.H#3FF                                   ;TIME-OUT
02D3        BRZFCI,MB,RDY,H#A                                  ;A=MB.ERR ROUTINE
02D4        JCI,TASK,NXT,PIX$                                  ;LOOP
02D5 NXT.ROW: PLRCI,TASK.H#3FF                                 ;TIME-OUT
02D7        BRZFCI,MB,RDY,H#A                                  ;A=MB.ERR ROUTINE
02D8        CONT  &AM2901.R,B,,ASR,0,AND,DA,MBDR,R12,R12 &HOLDFEMA ;R12=GRAY VALUE/2
02D9        CONT  &AM2901.R,B,,ASR,0,OR,ZA,,R3,R12 &HOLDFEMA   ;R3=GRAY VALUE/4
02DA        CONT  &LCCR &AM2901.,,,XOR,AB,,R12,R15 &HOLDFEMA   ;CK COLOR
```

```
02DB          JCI.NZ.$+4
02DC          CONT &AM2901..FEMA..ADD.AB..R7.R8 &HOLDFEMA   ;WRONG COLOR
02DD          CONT &AM2901..FEM..ADD.INC.ZA..R9.R9 &HOLDFEMA ;HISTO ADD
02DE          CONT &AM2901.B...ADD.INC.ZA..R9.R9 &HOLDFEMA  ;INC ADD
02DF          CONT &AM2901.B...OR.ZA..R4.R2 &HOLDFEMA       ;N=N+1
02E0          CONT &AM2901.B...ADD.AB..R1.R5 &HOLDFEMA      ;RESET DEL X
02E1          CONT &AM2901.B...OR.ZA..R6.R1 &HOLDFEMA       ;INC ROW ADD
02E2          CONT LCCR &AM2901.B...MINUS.1.ZA..R3.R3 &HOLDFEMA ;R6=NEXT ROW ADD
02E3          JCI.NZ.SRT.COL$                                ;LAST ROW
02E4          CONT &CTRL.LRL LOAD.LRL.H#0000.H#0040          ;START COL
02E5          CONT &AM2901.B...FEMA..DA.LRL..R7.R7 &HOLDFEMA ;LRL=64
02E6          CONT &AM2901.B...OR.DZ.FEM..R0.R0 &HOLDFEMA    ;AT ARY.ADD
02E7          CONT &AM2901..FEM..ADD.INC.DZ.FEM..R0.R0 &HOLDFEMA ;R0=ARY.ADD
02E8          CONT &AM2901..FEM..ADD.INC.DZ.FEM..R0.R0 .FEMA ;INC ARY.ADD
02E9          CONT &AM2901.B...OR.DZ.FEM..R1.R1 &MOD.FEMA    ;R1=NX
02EA          CONT &AM2901.B...OR.DZ.FEM..R2.R2 &MOD.FEMA    ;R2=MIN BIN #
02EB          CONT &AM2901.B...SUB.1.DZ.LRL..R3.R3 &HOLDFEMA ;R3=INTENSITY CTR
02EC          CONT &AM2901 MUL.MPY..OR.AB..R5.R5 &HOLDFEMA   ;% OF N
02ED          CONT &AM2901.B...AND.ZA..R5.R5 &HOLDFEMA       ;CUM=0
02EE          CONT &AM2901.B...OR.DZ.MPY..R1.R1 &HOLDFEMA    ;R1=MPY
02EF          CONT &AM2901.B...ADD.AB..R1.R1 &HOLDFEMA       ;2*MPY
02F0          CONT &CTRL.LRL LOAD.LRL.H#0000.H#8000          ;ROUND #
02F1          CONT &AM2901..FEM..ADD.DA.LRL..R1.R1 &HOLDFEMA
02F2          CONT &AM2901.B...AND.DG.FEM..R1.R1 &HOLDFEMA SWAP ;SWAP NX.
02F3          CONT &AM2901.B...AND.ZA..R6.R6 &HOLDFEMA       ;R6=AVE=0
02F4 NXT.BIN: CONT LCCR &AM2901..FEMA..SUB.2.0A.FEM..R2.R2 &HOLDFEMA ;AT BIN
02F5          CONT LCCR &ONE.BIN$                            ;BIN > MIN?
02F6          JCI.LE.ONE.BIN$
02F7          CONT &AM2901.B...ADD.INC.ZA..R4.R3 &HOLDFEMA   ;R4=INTENSITY
02F8          CONT &AM2901.B...OR.DZ.FEM..R9.R9 &HOLDFEMA SWAP ;R8=# SWAP
02F9          CONT &AM2901 MUL.MPY..OR.AB..R9.R4 &HOLDFEMA   ;#*INTENSITY
02FA          CONT &AM2901.B...ADD.DA.FEM..R5.R5 &HOLDFEMA   ;SUM CUM
02FB          CONT &AM2901 MUL.MPY..OR.AB..R6.R6 &HOLDFEMA   ;SUM AVE
02FC ONE.BIN: CONT LCCR &AM2901.B...MINUS.1.ZA..R3.R3 &HOLDFEMA ;LAST BIN?
02FD          JCI.N.DMP.ARY$
02FE          CONT LCCR &AM2901....MINUS.2.AB..R1.R5 &HOLDFEMA ;NX>CUM?
02FF          JCI.GT.NKT.BIN$
0300 DMP.ARY: CONT &CTRL.LRL LOAD.LRL.H#0040.H#0000          ;LRL=64
0301          CONT &AM2901 MUL.MPY..OR.DA.LRL..R5.R5 &HOLDFEMA ;SCALE CUM
0302          CONT &CTRL.LRL LOAD.LRL.H#0000.H#000A          ;LRL=SCALE FAC
0303          CONT &AM2901.B...OR.DZ.MPY..R5.R5 &HOLDFEMA    ;R5=CUM
0304          CONT &AM2901.B...OR.DZ.LRL..R8.R8 &HOLDFEMA    ;R8=SCALE FAC
0305          JCSI.TASK.DIV                                  ;AVE/CUM
0306          CONT &AM2901..MBAR..OR.ZA..R0.R0 &HOLDFEMA     ;ARY.ADD
0307          CONT &AM2901..MBDR..OR.ZA..R9.R9 &HOLDFEMA     ;AVE
0308          JCSI WRT.8086.TASK.MB.CMPLT                    ;WRITE ANS
0309          CONT LCCR &AM2901.B...MINUS.1.ZA..R10.R10 &HOLDFEMA ;LAST ITEM?
030A          JCI.NZ.NKT.BLB$
030B          JT INC.TIC                                     ;NEXT TASK

;GET FOUR PARAMETERS SUBROUTINE
;THIS ROUTINE GETS 4 PARAMETERS FROM BUF-PARM AND PUTS THEM
```

```
;IN R0(UHW),R1(LHW),R2(UHW),R3(LHW)
;
;ASSIGN:  R15=BUF PARM OFFSET
;RETURN:  R0-R3=FOUR PARMS
;REGISTERS USED: R15

0300C FOUR.PARMS: CONT &CTRL.LRL LOAD.LRL,H#0000,USR.PARMA        ;LRL=BUF.PARM ADDRESS
0300D          CONT &AM2901.B,MBAR,,ADD,DA,FEM,R15,R15 &HOLDFEMA  ;FEMA=LRL
0300E          CONT &AM2901.B,MBAR,,ADD,DA,FEM,R15,R15 &HOLDFEMA  ;R15=MBAR=BUF.PARM
0300F          CONT &CTRL.LRL LOAD.LRL,H#0000,SCRCHA              ;LRL=SCRATCH PAD ADDRESS
0310           CONT &AM2901.B,,FEMA,,OR,DZ,LRL &HOLDFEMA          ;FEMA=LRL
0311           CONT &CTRL.LRL LOAD.LRL,H#0000,H#0002              ;LRL=2
0312           JCSI RD.8086,TASK,MB.CMPLT                         ;READ DATA
0313           CONT &AM2901.B,,FEM,,AND,DQ,MBOR &HOLDFEMA         ;FEM=PARM FOR SWAP
0314           CONT &AM2901.B,,OR,DZ,FEM,R0,R0 &HOLDFEMA SWAP     ;R0=PARM 1
0315           CONT &AM2901.B,MBAR,,ADD,DA,LRL,R15,R15 &HOLDFEMA  ;NEXT MB ADDRESS
0316           JCSI RD.8086,TASK,MB.CMPLT                         ;READ DATA
0317           CONT &AM2901.B,,AND,DQ,MBOR,R1,R1 &HOLDFEMA        ;R1=PARM 2
0318           CONT &AM2901.B,MBAR,,ADD,DA,LRL,R15,R15 &HOLDFEMA  ;NEXT PARM ADD
0319           JCSI RD.8086,TASK,MB.CMPLT                         ;READ DATA
031A           CONT &AM2901.B,,FEM,,AND,DQ,MBOR &HOLDFEMA         ;FEM=PARM
031B           CONT &AM2901.B,,OR,DZ,FEM,R2,R2 &HOLDFEMA SWAP     ;R2=PARM SWAPPED
031C           CONT &AM2901.B,MBAR,,ADD,DA,LRL,R15,R15 &HOLDFEMA  ;LAST PARM ADD
031D           JCSI RD.8086,TASK,MB.CMPLT                         ;READ DATA
031E           RTNC TASK &AM2901.B,,,AND,DQ,MBOR,R3,R3 &HOLDFEMA  ;LAST PARM RETURN

;SINGLE BLOB SET UP ROUTINE
;
;THIS SUBROUTINE SETS REGISTERS R11-R15 FOR A FEATURE CALCULATION
;ASSIGN:  R15=BUF PARM OFFSET, OR R14=SCSN FOR LSNGLBLB
;RETURN:  R11=SBD ADDRESS, R12=#CPS, R14=IN CP ADD

031F SNGL.BLB:: CONT &CTRL.LRL LOAD.LRL,H#0000,USR.PARMA          ;LRL=USR.PARM ADDRESS
0320           CONT &AM2901.B,MBAR,,ADD,DA,LRL &HOLDFEMA          ;FEMA=LRL
0321           CONT &AM2901.B,MBAR,,ADD,DA,FEM,R15,R15 &HOLDFEMA  ;R15=MBAR=USR.PARM
0322           JCSI RD.8086,TASK,MB.CMPLT                         ;READ DATA
0323           CONT &AM2901.B,,AND,DQ,MBOR,R14,R14 &HOLDFEMA      ;R14=SCSN
0324 LSNGLBLB: CONT &AM2901.B,,MINUS.1,ZA,,R14,,R14,R14 &HOLDFEMA ;R14=SCSN-1
0325           CONT &CTRL.LRL LOAD.LRL,H#0000,CBAI                ;LRL=CBAI
0326           CONT &AM2901.B,,FEMA,,ADD,DA,LRL,R11,R11 &HOLDFEMA ;FEMA=CLOSED BLOB ADDRESS
0327           CONT &AM2901.B,,OR,DZ,FEM,R11,R11 &MOD.FEMA.LOWER.13 ;R11=SBD ADDRESS, GOTO IT
0328           CONT &AM2901.B,,AND,DQ,FEM,R14,R14 &MOD.FEMA       ;R14=IN CP ADDRESS
0329           RTNC TASK &AM2901.B,,,AND,DQ,FEM,R12,R12 &HOLDFEMA ;R12=#CPS, RETURN

END
;DIVIDE ROUTINE
;THIS ROUTINE DIVIDES R6 BY R5, PLACES ANSWER IN R9
;
;ASSIGN:  R5=DIVISOR, R6=DIVIDEND, R3=# TIMES THROUGH DIVIDE LOOP-1
;RETURN:  R9=ANS, R3=#, R5 UNCHANGED
;REGISTERS USED: R5-R9
;VARIABLES USED: NONE
;SUBROUTINES CALLED: NONE
```

```
0274 DIV:: CONT &AM2901.B.,OR.ZA.,R7,R5 &HOLDFEMA        ;R7=DIVISOR
0275        CONT &AM2901.B.,AND.ZA.,R9,R9 &HOLDFEMA      ;R9=0
0276        CONT &AM2901.B.,VEC.,OR.ZA.,R8,R8 &HOLDFEMA  ;VEC=R8
0277        LRV                                          ;LOAD INTO 2910 REG
0278        PLRCI.NTASK                                  ;PUSH ADD
0279        CONT LCCR &AM2901.L.B.,ASL.0.MINUS.2.AB.,R6,R7 &HOLDFEMA ;NUMERATOR-DIVISOR
027A        JCI.GE.$+4                                   ;REM>=0. JUMP
027B        CONT &AM2901.L.B.,ASL.0.OR.ZA.,R9,R9 &HOLDFEMA ;Q=0
027C        BRZF &AM2901.B.,SUB.2.ZA.,R7,R5 &HOLDFEMA    ;NEGATE DIVISOR. LOOP
027D        JCI.TASK.$+3                                 ;CONTINUE
027E        CONT &AM2901.L.B.,ASL.1.OR.ZA.,R9,R9 &HOLDFEMA ;Q=1
027F        BRZF &AM2901.B.,OR.ZA.,R7,R5 &HOLDFEMA       ;RELOAD DIVISOR. LOOP
0280        RTNC TASK &AM2901.,.,OR.ZA &HOLDFEMA         ;RETURN

;FE MICRO-WORD DEFINITIONS
;
WORD 48
;
;OVERLAYS
;
;SPECFIED:MUL,INT DES, EXT DES, SHIFT CTRL, ALU SEL, INT SRC, EXT SRC, RAM B, RAM A
;DEFAULT:NULL, NOP   , NULL    , ASR.0     , NONE   , NONE   , FEM   , XXX  , XXX
AM2901: DEF 8X,3VQ#0,3VQ#0,3VQ#1,3VQ#0.5V:H#00.6X,4VH#,3VQ#.3VQ#4,4VX.4VX.B#0.1X

;SWAP SPECFIED, DEFAULT=NORMAL
HOLDFEMA: DEF 1VB#0,B#00,43X,1X,B#0

;SWAP, NEXT FEM ADDRESS SPECIFIED
;DEFAULT: SWAP=NORMAL, NEXT FEM ADDRESS= INCREMENTED
MOD.FEMA: DEF 1VB#0,2VB#00,43X,1X,B#1

;SPECIAL CONTROL, LITERAL SPECIFIED
;DEFAULT: SPECIAL CONTROL=NULL. LITERAL=XXX
CTRL.LRL: DEF 8X,4VH#0,2X,16VX.16VX.B#11

;NEXT ADDRESS INSTRUCTIONS

;USED WITH ANY OVERLAY, CONDITION SPECIFIED
;DEFAULT= XXX

NO.CON: SUB 14X,6V:X,20X                                 ;CONTINUE
CONT: DEF 3X,H#E,B#1.NO.CON
HOLD: DEF 3X,H#E,B#0.NO.CON                              ;HOLD NEXT INST.
JZ: DEF 3X,H#0,B#1.NO.CON                                ;JUMP TO ZERO
```

```
BRZF:   DEF  3X,H#8,B#1,NO.CON                              ;BRCH R=0 TO STACK
;
;USED ALONE, SPECIAL CONTROL, CONDITION SPECIFIED
;DEFAULT: SPECIAL CONTROL=NULL, CONDITION=LCCR
;
NOCON.VT: SUB 4VH#0,10X,6V:H#00,13X,B#10
JT:     DEF  3X,H#2,B#1,NOCON.VT                            ;JUMP TASK
JCV:    DEF  3X,H#6,B#1,NOCON.VT                            ;JUMP CONDITION VECTOR
JCVH:   DEF  3X,H#6,B#0,NOCON.VT                            ;JUMP CONDITION VECTOR HOLD
;
;USED ALONE, SPECIAL CONTROL, CONDITION, JUMP ADDRESS SPECIFIED
;DEFAULT: SPECIAL CONTROL=NULL, CONDITION=LOAD CCR, JUMP ADDRESS=000
;
CON.I:  SUB  4VH#0,10X,6V:H#00,6X,12VH:H#000,B#10
JCSI:   DEF  3X,H#1,B#1,CON.I                               ;JMP COND SUB TO PL
JCI:    DEF  3X,H#3,B#1,CON.I                               ;JMP COND TO PL
JCIH:   DEF  3X,H#3,B#0,CON.I                               ;JMP COND PL & HOLD
PLRCI:  DEF  3X,H#4,B#1,CON.I                               ;PUSH COND LOAD PL TO R
PLRCIR: DEF  3X,H#5,B#1,CON.I                               ;PUSH COND LOAD PL TO R
JCSIR:  DEF  3X,H#5,B#1,CON.I                               ;JMP COND SUB PL ELSE R
JCIR:   DEF  3X,H#7,B#1,CON.I                               ;JMP COND PL ELSE R
BRZI:   DEF  3X,H#9,B#1,CON.I                               ;BRCH R=0 TO PL
JCIFP:  DEF  3X,H#B,B#1,CON.I                               ;JMP COND PL & POP
LRI:    DEF  3X,H#C,B#1,CON.I                               ;LOAD PL TO R
BRZFCI: DEF  3X,H#F,B#1,CON.I                               ;BRCH R=0 TO STCK COND TO PL
;
;USED ALONE, CONDITION SPECIFIED
;DEFAULT: CONDITION=LOAD CCR
;
CON.VT: SUB  10X,6V:H#00,13X,B#10
JCSV:   DEF  3X,H#1,B#1,H#5,CON.VT                          ;JMP COND SUB TO VECTOR
JCST:   DEF  3X,H#1,B#1,H#5,CON.VT                          ;             TASK
JCT:    DEF  3X,H#3,B#1,H#5,CON.VT                          ;JMP COND TASK
JCTH:   DEF  3X,H#3,B#0,H#5,CON.VT                          ;JMP COND TASK HOLD
PLRCV:  DEF  3X,H#4,B#1,H#4,CON.VT                          ;PUSH COND LOAD VEC TO R
PLRCT:  DEF  3X,H#4,B#1,H#5,CON.VT                          ;                TASK
JCSVR:  DEF  3X,H#5,B#1,H#4,CON.VT                          ;JMP COND SUB VEC ELSE R
JCSTR:  DEF  3X,H#5,B#1,H#5,CON.VT                          ;                TASK
JCVR:   DEF  3X,H#7,B#1,H#4,CON.VT                          ;JMP COND VEC ELSE R
JCTR:   DEF  3X,H#7,B#1,H#5,CON.VT                          ;             TASK
BRZV:   DEF  3X,H#9,B#1,H#4,CON.VT                          ;BRCH R=0 TO VECTOR
BRZT:   DEF  3X,H#9,B#1,H#5,CON.VT                          ;             TASK
JCVPP:  DEF  3X,H#B,B#1,H#4,CON.VT                          ;JMP COND TO VEC & POP
JCTPP:  DEF  3X,H#B,B#1,H#5,CON.VT                          ;             TASK
LRV:    DEF  3X,H#C,B#1,H#4,CON.VT                          ;LOAD VECTOR TO R
LRT:    DEF  3X,H#C,B#1,H#5,CON.VT                          ;             TASK
BRZFCV: DEF  3X,H#F,B#1,H#4,CON.VT                          ;BRCH R=0 TO STCK COND TO VEC
BRZFCT: DEF  3X,H#F,B#1,H#5,CON.VT                          ;             TASK
;
;MAY BE OVERLAYED ON AM2901 OR CTRL.LRL CONDITION SPECIFIED
;HOWEVER, LITERAL MUST NOT BE SPECIFIED
;DEFAULT: CONDITION=LOAD CCR
```

```
CON: SUB 14X,6V:H#00,20X
BCF: DEF 3X,H#D,B#1,CON        ;BRCH COND TO STCK
BCFH: DEF 3X,H#0,B#0,CON       ;BRCH COND STCK & HOLD
RTNC: DEF 3X,H#A,B#1,CON       ;RETURN FROM SUB COND
RTNCH: DEF 3X,H#A,B#0,CON      ;RETURN COND FROM SUB & HOLD
;
;AM2901 CONSTANTS
;----------------
;
;REGISTERS
;
R0:  EQU H#0
R1:  EQU H#1
R2:  EQU H#2
R3:  EQU H#3
R4:  EQU H#4
R5:  EQU H#5
R6:  EQU H#6
R7:  EQU H#7
R8:  EQU H#8
R9:  EQU H#9
R10: EQU H#A
R11: EQU H#B
R12: EQU H#C
R13: EQU H#D
R14: EQU H#E
R15: EQU H#F
;
;INTERNAL SOURCE
;
AQ:  EQU Q#0
AB:  EQU Q#1
ZQ:  EQU Q#2
ZB:  EQU Q#3
ZA:  EQU Q#4
DA:  EQU Q#5
DQ:  EQU Q#6
DZ:  EQU Q#7
;
;INTERNAL DESTINATION
;
Q:    EQU Q#0
NOP:  EQU Q#1
B.A:  EQU Q#2
B:    EQU Q#3
R.BQ: EQU Q#4
R.B:  EQU Q#5
L.BQ: EQU Q#6
L.B:  EQU Q#7
;
;ALU SELECT
```

```
ADD: EQU H#0
ADD.INC: EQU H#1
SUB.1: EQU H#4
SUB.2: EQU H#5
MINUS.1: EQU H#2          ;R-S, 1'S COMPLEMENT
MINUS.2: EQU H#3          ;R-S, 2'S COMPLEMENT
OR: EQU H#6               ;S-R, 1'S COMPLEMENT
                          ;S-R, 2'S COMPLEMENT
AND: EQU H#8
MASK: EQU H#A             ;R NOT AND S
XOR: EQU H#C
XNOR: EQU H#E
;
;SHIFT SELECT
;
ASR.0: EQU H#00           ;0 TO MSB, LOSE LSB
ASL.0: EQU H#12           ;0 TO LSB, LOSE MSB
ASR.1: EQU H#01           ;1 TO MSB, LOSE LSB
ASL.1: EQU H#13           ;1 TO LSB, LOSE MSB
RRC: EQU H#09             ;LSB TO C, C TO MSB
ROR: EQU H#0A             ;LSB TO MSB
RLC: EQU H#19             ;C TO LSB, MSB TO C
ROL: EQU H#1A             ;MSB TO LSB
DASR.0: EQU H#06          ;REG WITH 0
DASR.1: EQU H#03          ;   "
DASL.0: EQU H#16          ;   "
DASL.1: EQU H#17          ;   "
NORM: EQU H#10            ;0 TO LSB, MSB TO CARRY
DNORM.0: EQU H#14         ;NORM WITH 0
DNORM.1: EQU H#15         ;NORM WITH 0
SIGN.EX: EQU H#05         ;SIGN BIT TO MSB, LOSE LSB
;
;EXTERNAL SOURCE ONLY
;
CPE: EQU Q#1
LRL: EQU Q#3
;
;EXTERNAL DESTINATION ONLY
;
STAT.REG: EQU Q#1
;
VEC: EQU Q#3
MBAR: EQU Q#6
;
;EXTERNAL SOURCE/DESTINATION
;
MPY: EQU Q#2
FEM: EQU Q#4
MBDR: EQU Q#5
FEMA: EQU Q#7
;
;MULTIPLY CONTROL
;
MUL: EQU Q#1
```

```
DMUL.ADD: EQU Q#2
MUL.ADD: EQU Q#3
DMUL.SUB: EQU Q#4
MUL.SUB: EQU Q#5
LOAD.ACC: EQU Q#7
;SPECIAL CONTROL
;
INT.8086: EQU H#1
WRT.8086: EQU H#2
HLT.2901: EQU H#3
LOAD.LRL: EQU H#6
INC.TIC: EQU H#7
LOAD.TIC: EQU H#8
RD.8036: EQU H#9
CLR.MBOP: EQU H#A
CK.INT: EQU H#B
;
;FEM NEXT ADDRESS MODE
;
INC: EQU B#00
LOWER.13: EQU B#01
SLB.INV: EQU B#10
SLB.OUTV: EQU B#11
;
;SWAP
;
NOSWAP: EQU B#0
SWAP: EQU B#1
;
;INTERUPT CONDITIONS, INTERUPT REGISTER MUST BE PRE-LOADED (EXCEPT TASK)
;
MATCH: EQU H#1B
NMATCH: EQU H#1A
MB.RDY: EQU H#15
NMB.RDY: EQU H#14
CPE.RDY: EQU H#1F
NCPE.RDY: EQU H#1E
TASK: EQU H#37
NTASK: EQU H#36
;
;2901 CONDITIONS, CONDITION CODE REGISTER MUST BE PRE-LOADED
;
C: EQU H#2B
NC: EQU H#2A
Z: EQU H#25
NZ: EQU H#24
N: EQU H#2F
NN: EQU H#2E
O: EQU H#27
NO: EQU H#26
GE: EQU H#22
```

```
LT:     EQU H#23
GT:     EQU H#20
LE:     EQU H#21
LCCR:   EQU H#00
SCCR:   EQU H#01
RCCR:   EQU H#03
LINTR:  EQU H#10
SINTR:  EQU H#01
RINTR:  EQU H#03
XINTR.CCR: EQU H#02

;****************
;FEATURE EXTRACTOR VARIABLES
;****************
;
N.BLOBS: EQU 150              ;MAX # BLOBS AVAILABLE
N.CPS:   EQU H#0A50           ;MIN # CP AVAILABLE
N.SCNS:  EQU 4                ;# SCENES
SLB.SRT: EQU H#0              ;SLB CHAIN START ADDRESS
FBAI:    EQU SLB.SRT+3        ;FREE SLB ADDRESS INITIAL
SLB.END: EQU 3*85+SLB.SRT     ;SLB CHAIN END ADDRESS
PBAA:    EQU SLB.SRT+2        ;PREVIOUS SLB ADDRESS ADDRESS
SBD.SRT: EQU H#100            ;SBD CHAIN START ADDRESS
SBD.END: EQU 16*N.BLOBS+SBD.SRT ;SBD CHAIN END ADDRESS
CP.SRT:  EQU SBD.END          ;CP CHAIN START ADDRESS
CP.END:  EQU 2*N.CPS+CP.SRT   ;CP CHAIN END ADDRESS

CBAI:    EQU H#1F00           ;CLOSED BLOB ADDRESS INITIAL
SCNAI:   EQU CBAI+N.BLOBS     ;SCENE ADDRESS INITIAL
SRTVAR:  EQU SCNAI+N.SCNS     ;SORTER VARIABLE LOCATION
FBA.1A:  EQU SRTVAR           ;FREE SLB ADDRESS ADDRESS
FBA.1A:  EQU SRTVAR+1         ;FREE SLB ADD+1 ADDRESS
FDAA:    EQU SRTVAR+2         ;FREE SBD ADDRESS ADDRESS
FCAA:    EQU SRTVAR+3         ;FREE CP ADDRESS ADDRESS
CBAA:    EQU SRTVAR+4         ;CLOSED BLOB ADDRESS ADDRESS
SCNAA:   EQU SRTVAR+5         ;SCENE ADDRESS ADDRESS
NOISEA:  EQU SRTVAR+6         ;NOISE AREA ADDRESS
VPLVAR:  EQU SRTVAR+10        ;VPL VARIABLE LOCATION
USR.ATMA: EQU VPLVAR          ;STORAGE LOCATION FOR ATOMICS IN VPL
USR.ARYA: EQU VPLVAR+1        ;STORAGE LOCATION FOR ARRAYS IN VPL
USR.CPA:  EQU VPLVAR+2        ;STORAGE LOCATION FOR CPS IN VPL
USR.PARMA: EQU VPLVAR+3       ;STORAGE LOCATION FOR USER PARMS
USR.FNCA: EQU VPLVAR+4        ;STORAGE LOCATION FOR USER FUNCTION
USR.HISTA: EQU VPLVAR+5       ;STORAGE LOCATION FOR HISTOGRAM
USR.XYA:  EQU VPLVAR+6        ;STORAGE LOCATION FOR X,Y COOR
SCRCHA:   EQU VPLVAR+10       ;SCRATCH PAD LOCATION
DATAMASK: EQU H#003F
NAMASK.1: EQU H#FFE7
NAMASK.2: EQU H#FFC0
;
;ABSOLUTE FIRMWARE ADDRESSES
;
```

```
MB.CMPLT: EQU H#0007              ;MB ERROR ROUTINE ADDRESS
CP.TBLA:  EQU H#03FF-23           ;CPE JUMP TABLE ADDRESS
;
;STATUS WORDS
;
STAT.OK:  EQU H#0000               ;STATUS OK
NO.MTCH:  EQU H#FFFF               ;NO CP MATCH
INIT.OK:  EQU H#0001               ;POWER UP INITIALIZATION ROUTINE OK
OPN.BLB:  EQU H#0002               ;OPEN BLOB STATUS
CP.MEM:   EQU H#0003               ;NO CP MEMORY
SLB.MEM:  EQU H#0004               ;NO SLB MEMORY
SBD.MEM:  EQU H#0005               ;NO SBD MEMORY
BAD.WNDW: EQU H#0006               ;BAD CPE WINDOW
NO.XACK:  EQU H#0007               ;NO MULTI-BUS XACK
NO.BLOBS: EQU H#0008               ;NO BLOBS IN SCENE
FLSH.CPE: EQU H#0009               ;CPE AT END OF SCENE AFTER FE HUNG
;
END

TOTAL PHASE 1 ERRORS =     0
PROCEDURE GRAY@
    10 ARY.ADD=2E40H+2E9CH   ! ARRAY WHERE GRAY VALUES ARE
    20 F.A.GR@(ARY.ADD+2,15,2)    ! CALL FES, FIND GRAY VALUES, 15%, MIN=2
    30 NORM%=0   ! OVERALL LIGHT INTENSITY VALUE
    40 FOR I=1 TO Q.IT STEP 1   ! LOOK AT ALL ITEMS IN SCENE
    50   NORM%=NORM%+GRAY.AVE@(I)   ! COMPUTE OVERALL LIGHT CHANGE
    60 NEXT I
    70 NORM%=NORM%/Q.IT
    80 NORM=NORM%-BACK%(Q.IT+1)
    90 FOR I=1 TO Q.IT STEP 1
   100   Q=POSITION%(I,1)    ! GET ITEM POSITION NUMBER
   110   GRAY=GRAY.AVE@(Q)   ! GET GRAY VALUE AT POSITION Q
   120   GRAY=GRAY-BACK%(I)-NORM   ! GET COMPENSATED GRAY VALUE
   130   BL=BOUNDS%(POSITION%(I,2),1)
   140   BH=BOUNDS%(POSITION%(I,2),2)
   150   IF  NOT INBOUNDS(BL,GRAY,BH) THEN    ! COMPARE WITH EXPECTED COLOR VALUE
   160     ERROR%=ERROR%+1
   170   END IF
   180 NEXT I
```

```
PROCEDURE SET.BACK@
 10 ARY.ADD=2E40H+2E9CH
 20 WPOKE(ARY.ADD,Q.IT)
 30 FOR J=1 TO 56 STEP 1          ! ZERO POSITION NORMALIZATION ARRAY
 40   BACKZ(J)=0
 50 NEXT J
 60 N=40   ! TAKE 40 PICTURES
 70 FOR J=1 TO N STEP 1
 80   T.P(1)   ! TAKE PICTURE
 90   PILL.SORT@   ! FIND PILL POSITION NUMBERS
100   F.A.GR@(ARY.ADD+2,15,2)  ! CALL FES, GET GRAY VALUES
110   FOR I=1 TO Q.IT STEP 1
120     Q=POSITIONZ(I,1)   ! GET POSITION OF OBJECT I
130     GRAY=GRAY.AVE@(Q)
140     BACKZ(I)=GRAY+BACKZ(I)   ! AVERAGE NORMALIZATION NUMBERS
150   NEXT I
160   NORM=0
170   FOR K=1 TO Q.IT STEP 1
180     NORM=NORM+GRAY.AVE@(K)   ! COMPUTE OVERALL SCENE NORM NUMBER
190   NEXT K
200   NORM=NORM/Q.IT
210   BACKZ(I)=BACKZ(I)+NORM
220 NEXT J
230 FOR J=1 TO Q.IT+1 STEP 1      ! COMPLETE AVERAGE CALCULATION
240   BACKZ(J)=BACKZ(J)/N
250 NEXT J
```

We claim:

1. A visual image processing method for digitally processing an electronic monochrome video image of an object within a predefined field of view so as to automatically identify the color of the object, said method comprising the steps of:

converting a predetermined visual field of view to a sequence of digital electronic video signals each of which represents the gray scale intensity of a corresponding elemental picture element of a two dimensional view of such a visual field of view;

constructing a histogram of the frequency of occurrency of the gray scale intensity values over the field of view;

eliminating from the histogram gray scale values not associated with reflections attributable to the color of the object;

computing an average gray scale value for the object as a function of the remaining gray scale values in the histogram; and comparing the average gray scale value for the object to predetermined gray scale values for known colors to thereby identify the color of the object.

2. The method of claim 1 wherein the step of eliminating gray scale values from the histogram comprises the steps of:

establishing empirically a percent of picture elements within the field of view required to identify the object color; and disregarding any gray scale values associated with less than a predetermined number of picture elements.

3. The method of claim 1 wherein each of the gray scale intensity values are thresholded against a predetermined threshold level to identify those picture elements associated with the object.

4. The method of claim 3 wherein the thresholding step comprises converting at least one bit of the digital electronic signal to a threshold bit indicative of the presence of the object within the picture element corresponding to the signal.

5. The method of claim 1 and including the additional steps of:

identifying the possible colors to be associated with the object;

constructing a graph of the relative reflectivity of each color for the oject as a function of the frequency of incident light;

selecting a light frequency which provides distinct gray scale values for each color object to be identified; and obtaining the monochromatic video image through a light filter corresponding to the selected light frequency.

6. The method of claim 1 wherein the steps of converting the predetermined field of view to a sequence of digital electronic video signals comprises the additional steps of:

computing the gray scale values for a plurality of predetermined windows within the field of view;

summing the computed gray scale values to obtain an average normalization factor for the field of view;

comparing the average normalization factor to a similarly obtained normalization factor for each subsequently examined field of view;

dividing any difference in the respective normalization factors by the number of windows in the field of view to obtain a correction factor; and combining the correction factor with the average gray scale value for each window to thereby adjust the gray scale intensity values for overall light variation.

7. The method of claim 1 wherein the step of converting the predetermined field of view to a sequence of digital electronic video signals comprises the additional steps of:

computing the average gray scale value for each of a plurality of windows within the field of view; and subtracting the computed average gray scale value of each window from the corresponding gray scale intensity value for that window to thereby obtain a normalized gray scale intensity value.

* * * * *